United States Patent [19]
Lawrence

[11] Patent Number: 5,388,368
[45] Date of Patent: Feb. 14, 1995

[54] MEANS FOR EASY ATTACHMENT OF FISHING LURE, FLOAT, OR SINKER TO A FISH LINE

[76] Inventor: James L. Lawrence, P.O. Box 7176, East Wenatchee, Wash. 98802

[21] Appl. No.: 14,709

[22] Filed: Feb. 8, 1993

[51] Int. Cl.6 .................. A01K 91/00; A01K 93/00
[52] U.S. Cl. .................... 43/44.9; 43/44.89; 43/44.92
[58] Field of Search .............. 43/44.9, 43.1, 44.87, 43/44.89, 44.91, 44.92, 44.94

[56] References Cited

U.S. PATENT DOCUMENTS

| | | | |
|---|---|---|---|
| 1,883,574 | 10/1932 | Cleeland | 43/44.9 |
| 2,001,241 | 5/1935 | De Vries | 43/44.9 |
| 2,599,973 | 6/1952 | Bujaky | 43/44.9 |
| 3,514,891 | 6/1970 | Krull | 43/44.87 |
| 3,557,486 | 1/1971 | Wright | 43/44.89 |
| 3,782,025 | 1/1974 | Kochevar | 43/44.9 |
| 3,803,747 | 4/1974 | Cartwright | 43/44.81 |
| 3,885,339 | 5/1975 | Herkner | 43/42.05 |
| 4,279,092 | 7/1981 | Hutson | 43/44.91 |
| 4,674,226 | 6/1987 | Mahan | 43/42.36 |
| 4,691,468 | 9/1987 | Fernbach | 43/44.9 |
| 5,191,731 | 3/1993 | Peterson | 43/44.92 |

*Primary Examiner*—P. Austin Bradley
*Assistant Examiner*—Chuck Y. Mah
*Attorney, Agent, or Firm*—R. Reams Goodloe, Jr.

[57] ABSTRACT

A novel design for a fishing lure which makes for easy attachment to and detachment from a fishing line. The lure is preferably made with a resilient material which tends to return to its original closed shape after manual manipulation to insert a fishing line into a slit in the lure. In a second embodiment, a substantially helical slot is provided in the lure for frictional attachment to a fishing line. In another embodiment, a substantially linear slot is provided through the lure for passage therethrough of a fishing line, and the lure is provided with helical spring shaped line guides for encircling and thereby attaching the lure to the fishing line.

19 Claims, 2 Drawing Sheets

MEANS FOR EASY ATTACHMENT OF FISHING LURE, FLOAT, OR SINKER TO A FISH LINE

FIELD OF THE INVENTION

The present invention relates to a fishing float, lure, or sinker.

BACKGROUND OF INVENTION

This invention is applicable to surface floats, or bobbers, or to the under water gear at or near the hook, such as sinkers, lures, or floats; said floats being used to overcome the underwater weight of the hook, swivels, or other underwater gear. Such floats are commonly placed adjacent to the hook and have buoyancy approximating the underwater weight of the hook and leader tackle, and are used to lift the hook off the bottom to reduce the propensity of the hook to snag on the bottom of a river, lake, or the sea. Such floats are commonly called corkeys. A corkey may also be shaped and/or decorated to be a lure and/or to have elements such as skids or skirts to shield the hook from underwater weeds and the like.

DESCRIPTION OF THE PRIOR ART

Floats, sinkers, lures, and corkeys all have means to connect them to the fish line. In most cases, the line is cut and the float, sinker or lure is tied to loops provided for that purpose. Corkeys have a central bore which requires the end of the line to be fed through the bore. All of these devices require considerable dexterity to install on the fish line. Fish tend to bite on different color, shape, size, and motion of a lure under different conditions. Since it is very difficult to second guess a fish's appetite, a successful fisherman will try several lures on a fishing trip with the technology that is presently available on the market. To change many types of lures you are required to cut your line and re-tie it in order to change the color, shape or size.

While conventional products are satisfactory in operation, changing them is time consuming, requires changes to, and sometimes waste of, other gear, and requires dexterity often not present in cold-weather fishing or not possessed by a person with disabling physical handicaps including arthritis.

Therefore, what is needed is a lure device with means to receive a fishing line or leader requiring only the dexterity normally found while wearing gloves or with very cold hands.

Various inventions have previously been directed to means for attachment of devices to fishing lines. These include the following U.S. Pat. No. 3,837,783, issued Feb. 25, 1976 to Simpson for QUICK CHANGE FISHING FLOAT; U.S. Pat. No. 3,991,506, issued Nov. 16, 1976 to Wise for FISHING LINE FLOAT; U.S. Pat. No. 4,418,492 issued Dec. 6, 1983 to Rayburn for FISHING FLOAT; U.S. Pat. No. 4,563,831 issued Jan. 14, 1986 to Gibney for a FISHING FLOAT; U.S. Pat. No. 4,827,657, issued May 9, 1989 to Slehofer for FISHING EQUIPMENT; and U.S. Pat. No. 5,112,614 issued May 19, 1992 to Morita.

Floats with in them which are adapted to accept a fishing line are described in several patents; most are for surface type floats commonly described as bobbers. Representative of such devices are those seen in U.S. Pat. Nos. 3,367,683, 3,991,506, 4,418,492, and 4,563,831. However U.S. Pat. Nos. 3,867,783 and 4,418,492 are not integral and have extra pieces, to provide friction against the line U.S. Pat. No. 4,563,831 has a structure adapted to provide a locking function so as to prevent free movement of the fishing line relative to the device.

A helical structure for use in conjunction with a fish hook is shown in U.S. Pat. No. 4,827,657. That structure is designed with specific shape and used as an anchor for non-living bait, or in some cases, by itself as a lure. It requires, contrary to the present invention, that the helix be constructed of flexible material.

Helical structures for use in attachment of bobbers and lures assemblies to a line are shown in U.S. Pat. No. 5,113,614. Helix assemblies are provided at the ends of a wire spreader yoke which is affixed to a surface float device.

Neither of the two just mentioned U.S. Patents address the problem of quick connection of a fishing line to a lure.

SUMMARY OF THE INVENTION

In its simplest form, a fishing accessory is constructed of piece of resilient material with an axial bore to receive the fish line. The accessory is slit from the outer surface to the axial bore. The fishing leader is then snapped through the slit and into the bore. The slit then closes because of the restoration forces present within the resilient material, entrapping the line which may be loose or frictionally attached to the material depending on the relative diameters of the bore and fish line. Such simple embodiments of the present invention usually use a round, egg-shaped, or tapered cylinder shape.

Another embodiment uses a helical slit between the surface and an axial bore through which the fish line is passed as described above. The loops of the helix are cast around the fish line thus enclosing the line. The line is thusly held in the central bore by the geometry of the accessory, thus, permitting the slit to be open, i.e. a slot, permitting the accessory to be constructed of rigid material.

Another embodiment uses a helical slit between the surface and a radial distance short of the axis of the implement. The fish line is passed into the slot as described above, but comes to rest at the inner end of the slot. The loops of the helix and the accompanying fish line are cast around the now solid cylinder. The fish line is thus being held in a helix shape by the helical slot. Considerable friction is developed between the fish line and the helical accessory. Thus, the accessory is held fast to the fish line, yet easily installed or removed by winding or unwinding the fish line through the slot and around the central cylinder. The embodiment works equally well with open slots or closed slits.

Another embodiment uses an irregular or zigzag slit between the surface and axial bore, thus forming interdigitated elements, or fingers, through which slit the fish line is passed as described above. The fingers therefore surround the line. The line is thusly held in the central bore by the geometry of the accessory permitting the accessory to be constructed of rigid material.

Another embodiment uses appendage helixes of wire or similar material for line retainers at either end of a fishing accessory to receive the fishing line as described above, and an open slot through the body of the accessory to pass the fish line through the body, located between the helical line retainers. The slot may be helical or other shape so as to enhance friction between the line and accessory.

OBJECTS, ADVANTAGES, AND FEATURES OF THE INVENTION

My invention has no moving parts yet enables a fisherman to change to a different lure without cutting or re-tieing. My method is not only faster but also require less dexterity and prevents having to shorten the fishing line each time a lure is changed.

Different lures have different fish attraction capabilities and as fishing condition changes are not always obvious to the fisherman, my invention allows the fisherman to change to several different types or styles of lures in a matter of seconds. Varying light conditions for example, often dictate the size or color of lure on which a fish will bite. My invention allows the fisherman to change a lure in seconds giving the fisherman not only the ability to efficiently change size for different times of day, but is also fast enough to be able to change lures quickly enough for temporary light conditions such as a cloud blocking the sun that would pass before a fisherman using the presently available products could respond.

It is assured that a fisherman will have a much better chance of catching fish, if only for the fact that with my lures the fisherman can have his line in the water a greater percentage of the time. A knowledgeable fisherman will have his line in the water with the right lure for the conditions for a greater percentage of time. A less knowledgeable fisherman will be able to learn what fish will probably take much more quickly with my quick change method by trial and error much more quickly than he would using conventional products.

Therefore, it is an object of this invention to provide a fishing accessory such as a corkey, float, lure, sinker, or combination with means to quickly install or remove it from a fishing line even in the presence of gloves, numbness, or other impairment of dexterity.

It is a further object to enhance the luring ability of the accessory with shape, color, motion, and/or scent.

BRIEF DESCRIPTION OF THE DRAWINGS

FIG. 6 is a plan view looking down on the body of an attachment means constructed in accord with the present invention.

FIG. 7 is a side elevational view taken looking at the body of the attachment means first illustrated in FIG. 6.

FIG. 8 is an end view of the attachment means first illustrated in FIGS. 6 and 7 above.

FIG. 9 is a side elevational view taken looking at the body one embodiment of the attachment means of the present invention, where the slot is provided extending inward toward, but not reaching, the central axis.

FIG. 10 is a top view of the attachment means first illustrated in FIG. 9 above, showing the slot extending inward toward, but not reaching, the central axis.

DETAILED DESCRIPTION OF THE PREFERRED EMBODIMENT

Figure 1:
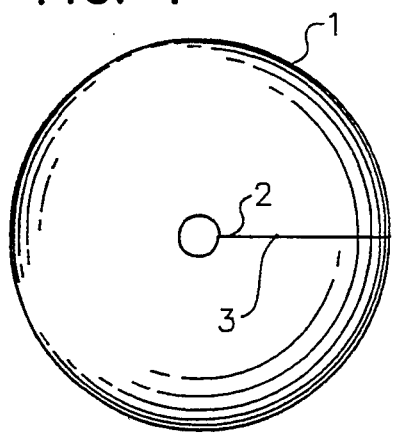
FIG. 1 is a an axial view of the preferred embodiment of the invention using a straight, self closing slit for entry to the central bore.
Figure 2:
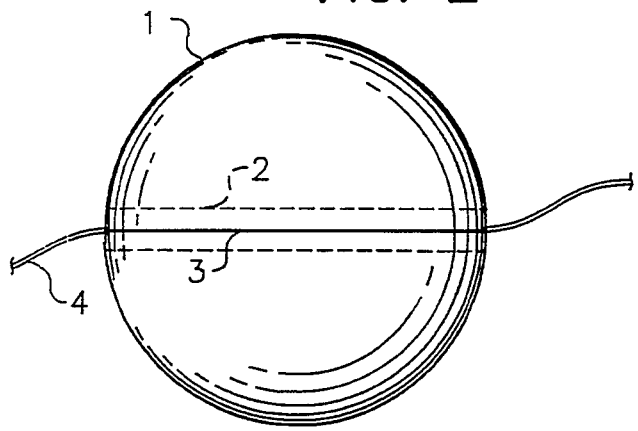
FIG. 2 is an equatorial view of the same embodiment.

Referring to FIGS. 1 and 2, the simplest form of this line attachment means for a float, lure, or sinker is a body of any shape 1, constructed of resilient material and an overall specific gravity suitable to provide the desired amount (if any) of flotation or sinking as required by the application. Body 1 has axial hole 2 thru the body, and a longitudinal slit 3, from the outside of the body extending into the axial hole 2 at the center of the lure, to allow a compression entry path for the fishing line 4, to be easily positioned thru the center of the body 1 for use as any other float, lure, or sinker.

With a small amount of pressure the line 4 can be immediately inserted and the pliability of the lure body 1 material will close the slit 3 to keep the fishing line 4 from disengaging from the axial hole 2 until such time the line 4 is pulled back out the same path with slight pressure without harming the fish line 4. This form of fishing accessory body 1 will work with easily pliable materials such as cork, balsa wood, or synthetic materials without restraining the possibilities of external shapes, designs, or colors of the accessory.

Figure 3:
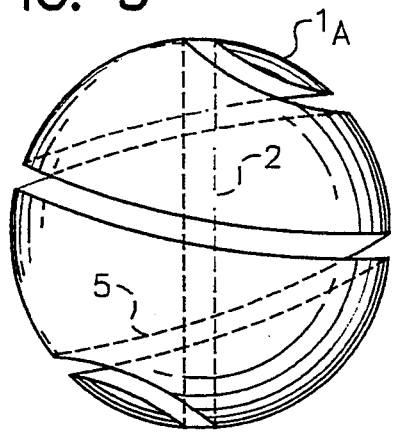
FIG. 3 is an equatorial view of a second embodiment of the invention utilizing an open helical or spiral slit for entry to the central bore.
Figure 4:
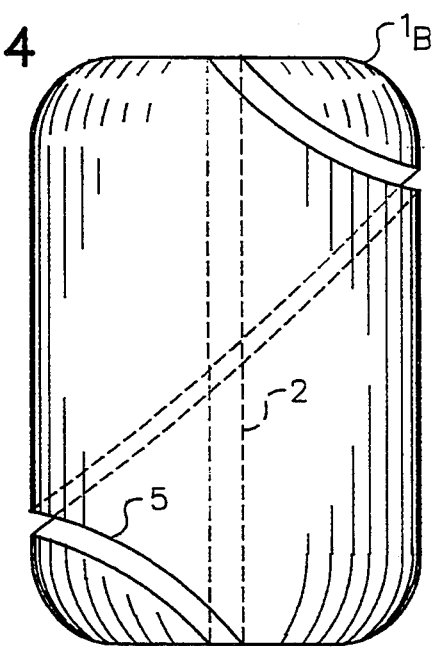
FIG. 4 is a side view of a third embodiment using a helical or spiral slit in an essentially cylindrical shaped body.

An alternate form of this line attachment means for a float, lure, or sinker is to form the slit 5' or 5" in a helical pattern in body $1_A$ or $1_B$ as shown in FIGS. 3 and 4. Since the line 4 is surrounded by the helical pattern, the slot 5' or 5" need not be closed.

Figure 5B:
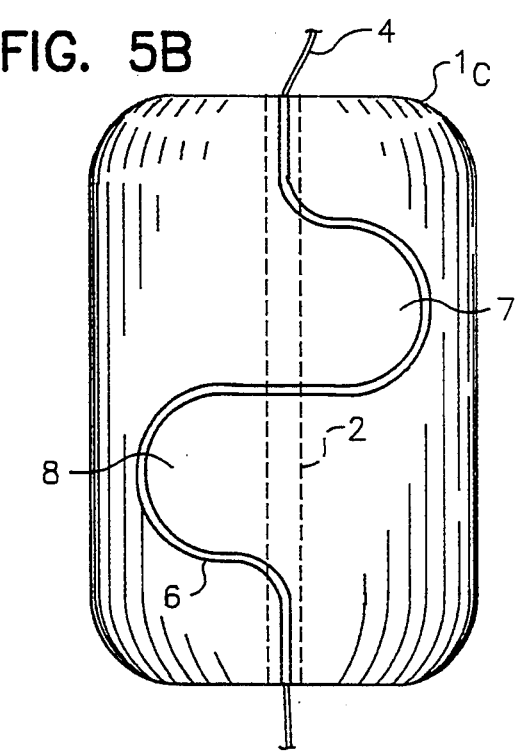
FIGS. 5A and 5B illustrate interdigitated fingers which are essential elements in several embodiments of the invention.
Figure 5A:
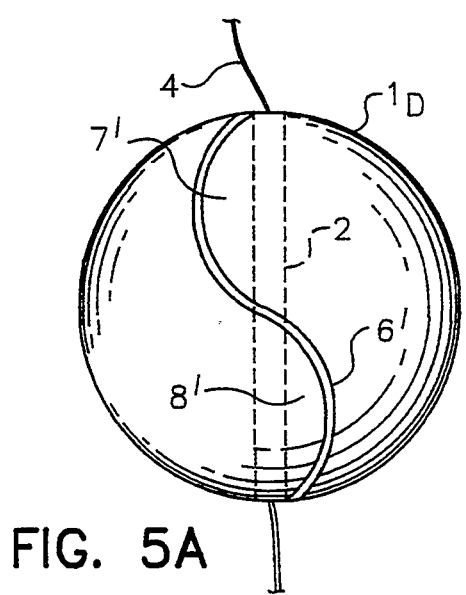

FIGS. 5A and 5B show use of a zigzag shaped slit 6 or 6' in body $1_C$ or $1_D$ respectively, to form two or more interdigitated fingers 7 and 8 or 7' and 8', respectively, that fit around the fish line 4. Since the line 4 is surrounded by the interdigitated fingers, the slot 6 or 6' need not be closed as required by the shape shown in FIGS. 1 and 2 above. Thus, the slot 6 or 6' may optionally have width adequate to pass a fish line 4. Since resilience is not required, the fishing accessory $1_C$ or $1_D$ may be constructed of hard or firm material. Note that a helical slot of less than one revolution is a structure of two interdigitated fingers.

In use, the fishing implement $1_A$, $1_B$, $1_C$, or $1_D$ is fastened to the fish line 4 by simply holding the body $1_A$, $1_B$, $1_C$, or $1_D$ in one hand and winding the fish line 4 around the body $1_A$, $1_B$, $1_C$, or $1_D$ and into the slot, hence into the central bore 2. Removal is simply the reverse process.

FIG. 5B illustrates the invention showing that the slot 6 does not have to be a continuous same-shape throughout its length. In this illustration, the end sections of the slot 6 are essentially straight and may be required to accommodate particular shapes of a fishing implement.

Figure 6:
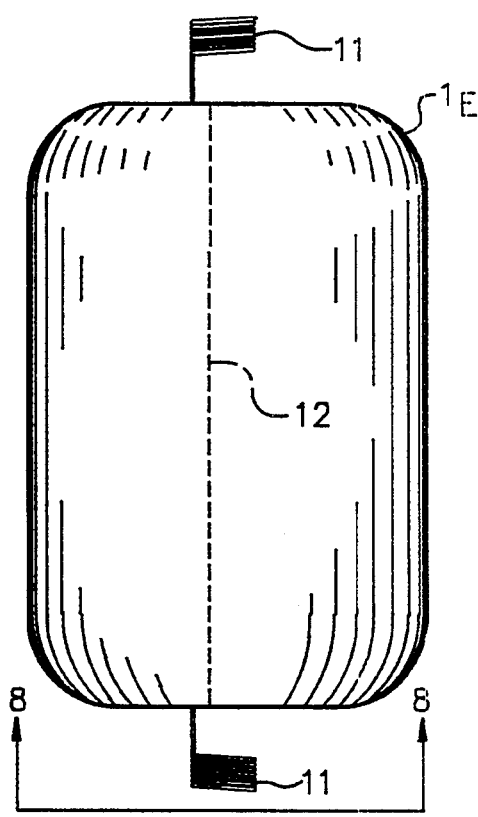
FIGS. 6, 7, and 8 show helical coil appendages as the elements of the invention.
Figure 7:
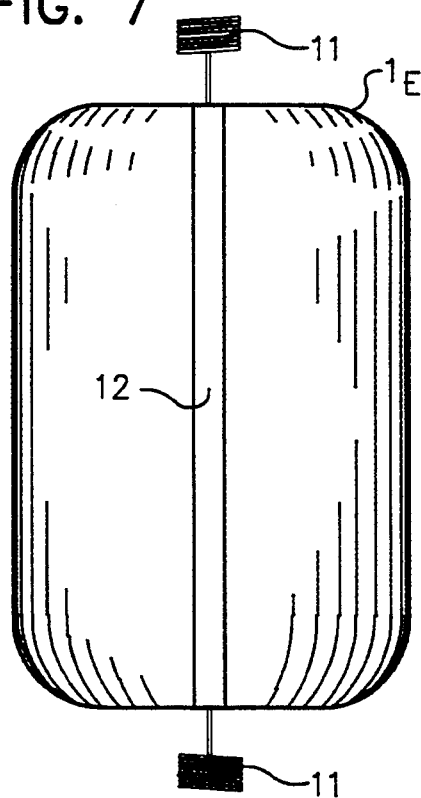
Figure 8:
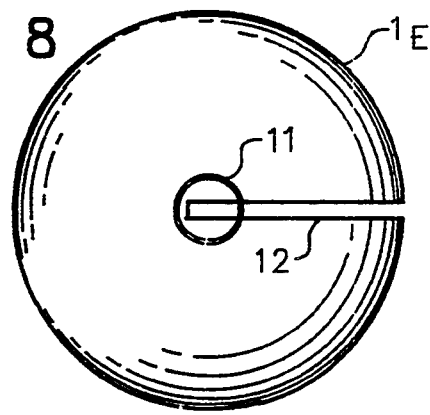

Turning now to FIGS. 6, 7, and 8, another alternate form of this means of attaching a line 4 to a float, lure, or sinker is to form an attachment means 11 at each end of the body $1_E$ and provide a slot 12 for passage for the fish line 4 between the two attachment means. Metallic or plastic wires embedded in the body $1_E$ have helical spring attachment means 11 formed at the free ends. Slot 12 is sufficiently wide and deep to freely admit and pass the fish line 4 strung through the helical spring attachment means 11.

In use, the fishing implement $1_E$ is attached to the fish line 4 by simply holding the body $1_E$ in one hand and winding the fish line 4 between the coils of the wire helix attachment means 11 with the other hand. The other end is attached to line 4 similarly by either switching hands or turning the body $1_E$ around. Removal is simply the reverse process. One-handed fishermen can use the invention simply by using some other means to substitute for the holding hand.

Some applications require the float, lure, or sinker to be fixed rather than slide on the fish line 4. Simple variations provide adequate friction to prevent sliding, yet not diminish the easy-on, easy-off properties of the invention. In general, the friction will be provided by causing the line passage way or slot to have curves or corners, i.e., the line 4 will have to pull around friction producing corners in the slot.

Figure 9:
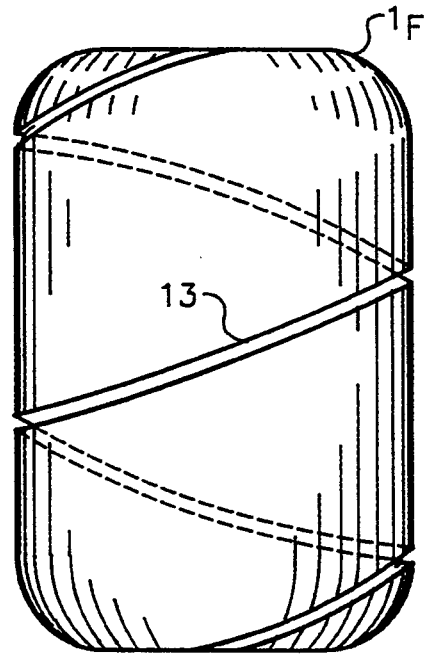
FIGS. 9 and 10 illustrate an embodiment without an axial bore or channel.
Figure 10:
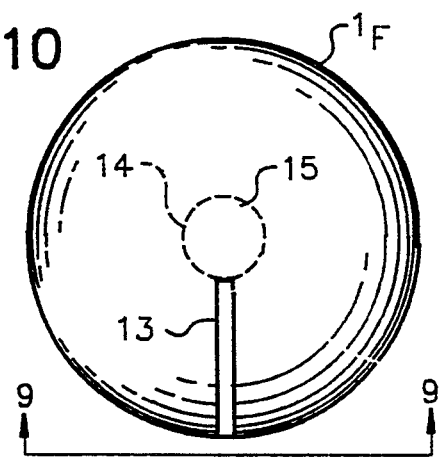

FIGS. 9 and 10 illustrate a novel expression of this friction generating concept. Body $1_F$ is cut with helical slot 13, but the slot 13 is cut only part way into the body $1_F$. The locus of the inside end 14 of the slot 13 thusly is a smaller spiral enclosing a solid core 15. The core 15 occupies approximately the same space formerly vacated by the axial bore 2 in FIG. 4, for example. A fish line 4 wound into the slot 13 will come to rest at the bottom or inside end 14 of the helical slot 13 and itself will be formed into a helical shape conforming to the bottom surface or inside end 14 of the slot 13. Tension on the fish line 4 will pull the line 4 against the solid core 15 and result in increased friction. Obviously, insertion and removal of line 4 is unaffected whether the central element is a bore 2 or a solid core 15.

As a lure, a fishing implement as described by bodies 1 through $1_F$ above colors, patterns, textures, shape, wings or other motion inducing shapes, scents or scent holding pockets, all intended individually or in combination to attract fish.

As a corkey-float or corkey-lure, an implement as described by bodies 1 through $1_F$ above may be fitted with skirts, skids, or pockets to deflect weeds and otherwise reduce the tendency of a hook to snag objects in the water or on the bottom.

The descriptions and figures represent shapes usually formed by molding or similar processes. There is nothing in the concept precluding manufacture by cutting the individual body pieces from lengths of bulk stock. Helical attachment means 11 may be constructed by winding rod or wire around a mandrel. Further the body shapes 1 through $1_F$ above represented are generally smooth and symetrical although the same technique can be applied to oblique or odd shape bodies.

It is my view that these concepts illustrated and described fulfill the objectives previously set forth.

The foregoing is considered as illustrative only of the principles of the invention. Further, since numerous modifications and changes will readily occur to those skilled in the art, it is not desired to limit the invention to exactly as described, and accordingly all suitable modifications and equivalents may be resorted to which fall within the scope of the claims of the invention.

I claim:

1. A lure device for attachment to a fishing line to attract fish, said device adapted to be placed into a receiving water having fish therein, said device comprising:
    a body having a preselected specific gravity, and wherein said preselected specific gravity provides (i) positive, or (ii) negative, or (iii) non-negative buoyancy with respect to said receiving water;
    said body having an exterior surface,
    said device further comprising:
    an approximately axial passage through said body, said passage adapted for the passage of a fishing line therethrough, and
    a slit, said slit extending from the surface of the said body to and intersecting with said axial passage throughout the length of said passage; and
    wherein said slit defines two or more fingers, said fingers co-operating interdigitally, said slit extending from said surface of said body to said axial passage as defined by said fingers.

2. The device according to claim 1 wherein said slit is a slot of width sufficient to allow passage of said fishing line.

3. A lure device for attachment to a fishing lint to attract fish, said device adapted to be placed into a receiving water having fish therein, said device comprising:
    a body having a preselected specific gravity, and wherein said preselected specific gravity provides (i) positive, or (ii) negative, or (iii) non-negative buoyancy with respect to said receiving water;
    said body having an exterior surface and a centrally located major axis; said device further comprising a slit extending inwardly from said surface of said body toward but not reaching said central axis thereof, said slit adapted to receive a fish line therein so as to frictionally engage said body;
    wherein said slit remains closed except when said line is passed therethrough.

4. The device according to claim 3 wherein said slit is in a generally helical shape.

5. The device according to claim 4 wherein said slit is a permanent slot of width sufficient to allow passage of said fishing line.

6. The device according to claim 3 wherein said slit defines two or more fingers, said fingers co-operating interdigitally, said slit extending from said surface of said body toward said central axis.

7. The device according to claim 6 wherein said slit is a permanent slot of width sufficient to allow passage of said fishing line.

8. The device as set forth in claim 3, further comprising colors and visual patterns on said external surface, so as to be attractive to said fish.

9. A lure device for attachment to a fishing line to attract fish, said device adapted to be placed into a receiving water having fish therein, said device comprising:
    a body having a preselected specific gravity, and wherein said preselected specific gravity provides (i) positive, or (ii) negative, or (iii) non-negative buoyancy with respect to said receiving water;
    said body having (i) an exterior surface, and (ii) two ends;
    said device further comprising:
    an approximately axial passage through said body, said passage adapted for the passage of a fishing line therethrough,
    and a slit from the surface of the said body to and intersecting with the said axial passage throughout the length of said passage; and,
    two line attachment means, one each of said last mentioned means located at each of said ends of said body.

10. The device as set forth in claim 9 wherein at least one of said attachment means is substantially helical in shape.

11. The device as set forth in claim 9 wherein said slits form fingers co-operating interdigitally.

12. The device as set forth in claim 9 wherein said device further comprises a slot including friction surfaces, said surfaces adapted to produce friction on said fish line, so as to tend to prevent said fish line from passing therethrough.

13. The device as set forth in claim 9 further comprising colors and visual patterns on said external surface, so as to be attractive to said fish.

14. A lure device for attachment to a fishing line to attract fish, said device adapted to be placed into a receiving water having fish therein, said device comprising:
   a body having a preselected specific gravity, and wherein said preselected specific gravity provides (a) positive, or (b) negative, or (c) non-negative buoyancy with respect to said receiving water;
   said body having (i) an exterior surface, (ii) two ends, and (iii) a centrally located major axis,
   said device further comprising:
   a slit extending inwardly from said surface of said body toward but not reaching said central axis thereof, said slit adapted to allow passage therethrough and receipt therein of a fish line so as to frictionally engage said body with said fish line; and,
   two line attachment means, one each of said last mentioned means located at each of said ends of said body; and
   wherein said slit remains closed except when said line is passed therethrough.

15. The device according to claim 14 wherein said slit is in a generally helical shape.

16. The device according to claim 14 wherein said slit defines two or more fingers, said fingers co-operating interdigitally, said slit extending from said surface of said body toward said central axis.

17. The device according to claim 14 wherein said slit is a permanent slot of width sufficient to allow passage of said fishing line.

18. The device as set forth in claim 14, wherein at least one of said attachment means is generally helical in shape.

19. The device as set forth in claim 18, wherein said attachment means further comprises a helical spring shaped part.

* * * * *